(12) United States Patent
Copeta

(10) Patent No.: US 6,403,174 B1
(45) Date of Patent: Jun. 11, 2002

(54) ELEMENT FOR THE FORMATION OF BAGS FOR PACKING FOOD PRODUCTS AND NOT UNDER VACUUM

(76) Inventor: Giovanni Copeta, Via Corte Moronati 15, Colombare di Sirmione (Brescia) (IT)

( * ) Notice: Subject to any disclaimer, the term of this patent is extended or adjusted under 35 U.S.C. 154(b) by 0 days.

(21) Appl. No.: 09/459,672

(22) Filed: Dec. 13, 1999

(30) Foreign Application Priority Data

Jul. 27, 1999 (IT) ..................................... BS99U000073

(51) Int. Cl.$^7$ ................................................. B32B 1/08
(52) U.S. Cl. .................... 428/34.1; 428/34.1; 428/34.3; 428/34.6; 428/34.7; 428/35.2; 206/524.8; 383/100; 383/101; 383/107
(58) Field of Search ................................ 428/34.1, 34.3, 428/34.6, 34.7, 35.2; 206/524.8; 383/100, 101, 107

(56) References Cited

U.S. PATENT DOCUMENTS

RE34,929 E * 5/1995 Kristen ..................... 206/524.8
5,554,423 A * 9/1996 Abate ........................ 428/35.2

* cited by examiner

Primary Examiner—Harold Pyon
Assistant Examiner—Patricia L. Nordmeyer
(74) Attorney, Agent, or Firm—McGlew and Tuttle, P.C.

(57) ABSTRACT

A sheet element is provided for the formation of bags for packing food products and not under vacuum. The layer or film (12) intended to form the inner surface of at least one side of the bag has seams (13, 23) which are facing not in parallel to the longitudinal axis of the bag and each having a plurality of transverse cavities or notches (16) and at least one longitudinal groove to promote the evacuation of air.

17 Claims, 2 Drawing Sheets

ELEMENT FOR THE FORMATION OF BAGS FOR PACKING FOOD PRODUCTS AND NOT UNDER VACUUM

FIELD OF THE INVENTION

The present invention pertains to a sheet element that can be used for the formation of bags, which are suitable for packing and for preserving food products under vacuum as well as not under vacuum.

BACKGROUND OF THE INVENTION

Bags for the above-mentioned use, which are produced starting from at least one flat sheet folded onto itself and/or cut out and sealed in a suitable manner to form a container closed on three sides and having an open mouth which can be closed by means of sealing after having inserted the desired product therein, have already become known from the state of the art.

The starting sheet usually consists of at least two layers or films made of materials which are different, usually transparent, intimately combined with one another on the inside surface by means of any technically available system, such as coextrusion, lamination, stratification for successive extrusions, etc.

At least one of these layers, the outer layer in case of only two layers or the outer or middle layer in the case of three or more layers, consists of a thermoplastic material that is compatible for contact with foods and is impermeable to gases, such as: polyamide, polyester (properly treated), ethyl vinyl alcohol or any other material suitable for the object that may be technically available.

The object of this layer is to prevent the penetration inside the bag of oxygen, which proves to be the main cause of the perishability of many foods.

However, the inside layer consists of a thermoplastic material that is likewise compatible for contact with foods and can be readily heat-sealed, such as polyethylene, polypropylene, ethyl vinyl acetate or any other material suitable for the object that may be technically available.

Any other layers always only consist of thermoplastic materials that are compatible for their contact with foods and have the function of binding among the various layers of different material in order to improve their joining or they have protective functions.

Also well known from the state of the art are bags in which the inside layer of at least one of its sides is provided with channels in order to promote the outlet of air when applying the vacuum to the package and closing it. According to one embodiment such channels are obtained by means of a pressure deformation of the starting material, especially with an embossing operation, by means of which a network of channels crossed and separated by protuberances or islands is formed.

Such a network of channels promotes the evacuation of air but has the drawbacks of having a process for its production that is burdensome and very delicate in the setup phase (a compression force that is too high may lead to damage of the film, while a force that is too low may not produce the permanent deformation that creates the channels for the evacuation of the air).

Moreover, the resulting product has the defect that, in the presence of heat, the sheet tends to recover its original flat shape, and the channels tend to disappear. This implies that in the use that is provided with the suction machines corresponding to the sealing bar of the heat-sealing unit the heat of the previous sealing operations makes the channels for an evacuation of the air disappear, making the product unusable, unless one waits for the complete cooling off which involves a useless loss of time. Moreover, a difficulty was found in ensuring the tightness of the seal in the presence of folds on the smooth sheet.

According to another embodiment, filiform, parallel protuberances are provided on the inner surface of at least one side of the bag, which extend longitudinally from the mouth to the bottom of the bag. This results in the formation of parallel channels, which, however, do not communicate with one another crosswise. This represents a drawback since, if for any reason, not all the channels communicate with the generator of the vacuum at the time of closing, air pockets may remain in the bag, compromising the preservation of the packaged product.

For the reason described above, the bag may thus have a maximum width that is equal to the opening mouth of the suction and sealing unit.

Moreover, the production process is very delicate in the setup phase, and filiform elements, which are obtained by coextrusion in order to be able to be readily sealed, must have highly reduced dimensions, with the result of being uncontrollable both in terms of shape and in terms of size, and therefore, the effectiveness of the parallel channels that they produce may be extremely variable. In addition, the channels that are to be created are air spaces between the protuberances and the upper sheet, which, being flexible, may definitely adhere to the protuberance, considerably reducing the air space blocking the evacuation of air.

This occurs exactly in the zone in which the suction is exerted, where a seal made of elastic material is present (which is necessary for the holding of the vacuum during the operation proper), which tends to make the two sheets adhere.

SUMMARY AND OBJECTS OF THE INVENTION

Starting from these premises, the primary object of the present invention is to provide a material for bags for the vacuum-packing of products, which, due to its shape and configuration, is produced in a simpler and a more functional manner from the embossed and from the material with channels that run longitudinally from the mouth to the bottom of the bag, and which is able to ensure a complete discharge of the air under all conditions at the time of creating the vacuum and of closing the container.

This object is accomplished, according to the present invention, with a sheet element for the formation of a bag for the vacuum-packing of products, wherein the element has at least two layers or films of different material that are joined together and where the layer or film intended to form the inner surface of at least one side of each bag has channels, which are obtained by means of ribs, which are oriented diagonally with respect to the longitudinal axis of the bag, and each is provided with a plurality of transverse cavities or notches, which are spaced along the rib proper. Thus, in each bag, the diagonal ribs delimit the channels which converge at a non-90° angle at the mouth of the bag, and the transverse cavities or notches on the ribs put the channels into a lateral communication with one another, all of which is to make possible a complete evacuation of air from the bag when the vacuum is applied. Actually, even the channels that should then not communicate directly with the source of the vacuum applied to the mouth of the bag, would, however, hereby be connected indirectly by means of the cavities or notches on the ribs.

These projections or ribs may be parallel to one another or crossed and each produced with one or more parallel grooves, having the same function as the above-mentioned channels. These are made of a thermoplastic material having the same characteristics as the material forming the inner layer of the sheet, and therefore, suitable for contact with foods and readily sealable.

Moreover, the ribs represent additional material (support material), which is an advantage for the effectiveness of the sealing by blocking any folds that should form in the individual sheets.

Further details of the present invention shall become evident from the description provided below with reference to the attached simplified drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
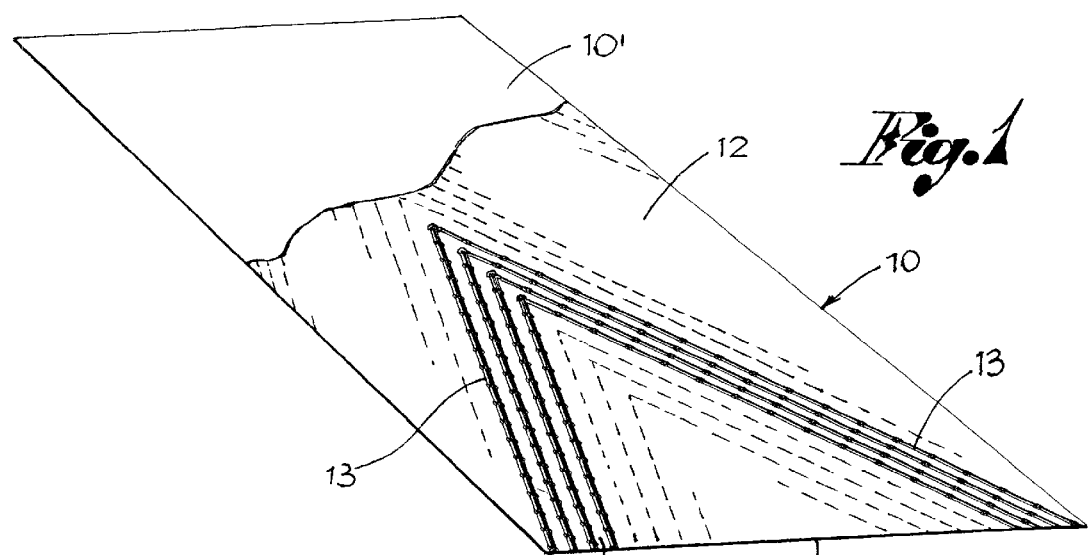
FIG. 1 is a perspective view showing a part of a sheet element for the production of bags according to the present invention.

Referring to the drawings in particular, a sheet element 10, usually consisting of at least two overlapping layers or films, has a first layer or film 11 made of a first material and a second layer or film 12 made of another material.

Figure 4:
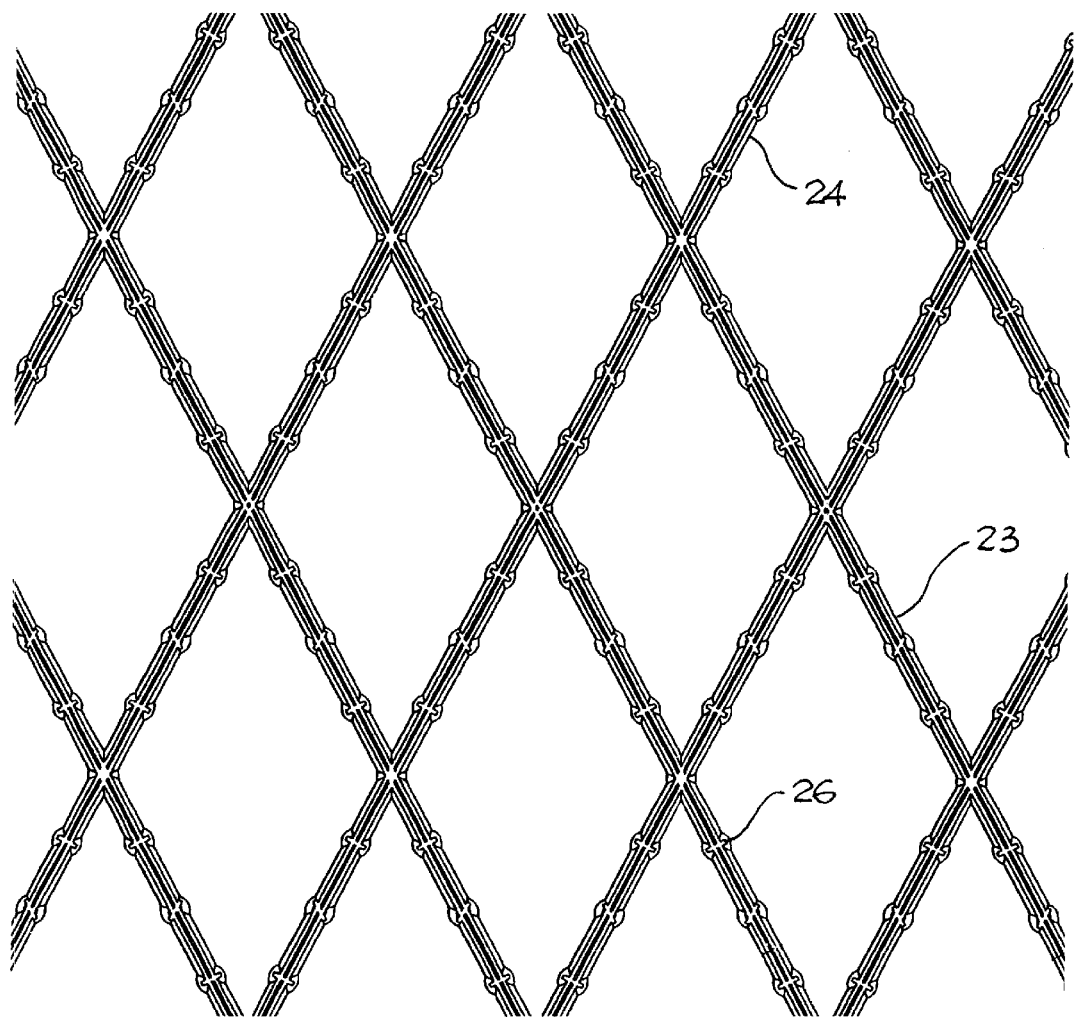
FIG. 4 is a plane view of another embodiment of the present invention.

On this second layer or film 12 one or two rows of channels 14 are provided, which are obtained by the projecting ridge elements, or ribs 13, which are oriented diagonally with respect to the margins of the sheet element 10. If only one row of ribs 13 is provided, these ribs 13 are all oriented diagonally in the same direction. If two or more rows of seams are provided, a first row is oriented in one direction and a second row is oriented in another direction, as shown in FIG. 1. It is then possible that the seams cross one another, defining the geometric shapes as in FIG. 4.

Other arrangements, shapes and linear or curvilinear flow may be used as long as these are not parallel to the longitudinal axis of the resulting container.

Figure 3:
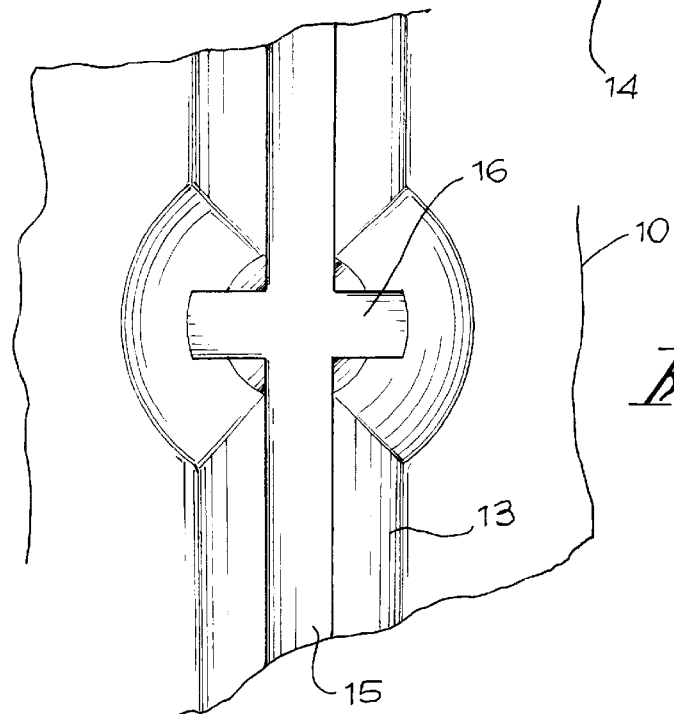
FIG. 3 is an enlarged plane view of a segment of a projection of the sheet element.
Figure 2:
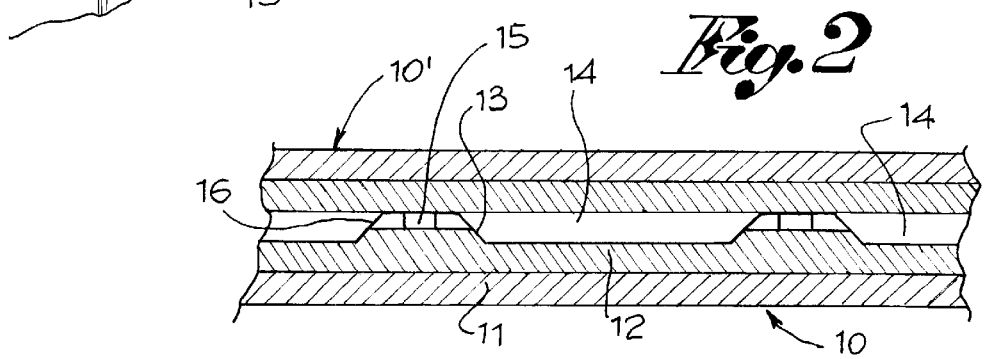
FIG. 2 is a sectional view showing an integral section of a part of a bag.
Figure 5:
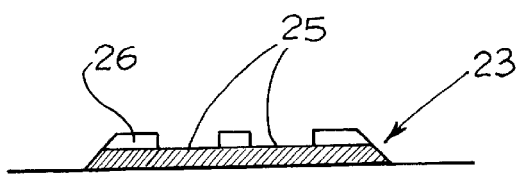
FIG. 5 is an enlarged cross sectional view corresponding to transverse cavities of the embodiment of FIG. 4.
Figure 6:
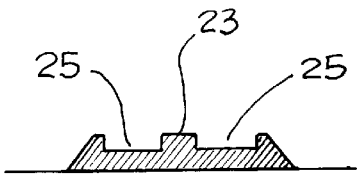
FIG. 6 is an enlarged cross sectional view along those of a seam of the embodiment of FIG. 4.

Each diagonal or cross rib 13, 23 may be continuous or intermittent and run longitudinally from one groove 15 as in FIG. 2 or from two grooves 25 as in FIG. 5. The grooves, in suitable number, shape and dimensions, have the object of defining the additional channels, which are much more controllable from the point of view of the effectiveness in the extraction of air. Moreover, the transverse cavities or notches 16, 26, which intersect the groove or the grooves and put the adjacent channels or spaces 14 on opposite sides of the seam proper in communication with one another, are provided along each rib 13 (FIGS. 3 and 5).

In practice, a bag for the vacuum-packing of products can be produced by folding and/or by cutting out and sealing along two or more sides the single sheet element 10 described above, or by using the element 10 with another element 10' that is similar but does not have the ribs 13, as shown in FIG. 2.

In each case, the ribs 13 are on the inner surface of at least one side of the resulting bag. The ribs 13 and the diagonal channels 14 defined by them then converge towards the mouth of the bag at a non-90° angle, and make possible, together with the longitudinal grooves 15, as well as with the transverse cavities or notches 16, a reliable evacuation of the air from the bag when the vacuum is being created there, even if the opening mouth of the bag is smaller than the bag itself.

While specific embodiments of the invention have been shown and described in detail to illustrate the application of the principles of the invention, it will be understood that the invention may be embodied otherwise without departing from such principles.

What is claimed is:

1. A sheet element for the formation of bags for vacuum-packing food products, the sheet element comprising:

at least two layers or films made of different material that are joined together, one of said layers or films being an inner layer or film intended to form an inner surface of at least one side of each bag, said inner layer of film having ribs comprising material disposed on said inner layer of film and projecting beyond an adjacent surface of said inner layer of film, said ribs being oriented to be not in parallel to a longitudinal axis of the bag, each rib having a plurality of transverse cavities or notches, which are spaced along each respective rib, said ribs cooperating to delimit channels or spaces converging to a mouth of the bag at a non-90° angle, said transverse cavities or notches providing a passageway between adjacent channels on opposite sides of each rib.

2. The element in accordance with claim 1, wherein said ribs are continuous or intermittent in length and rectilinear or curvilinear.

3. The element in accordance with claim 1, wherein said ribs have at least one longitudinal groove intersecting said cavities or notches along the rib.

4. The element in accordance with claim 2, wherein said ribs have at least one longitudinal groove intersecting said cavities or notches along the rib.

5. The element in accordance with claim 1, wherein said ribs comprise one row of ribs, the ribs extending in the same direction.

6. The element in accordance with the claim 1, wherein said ribs comprise at least two rows of ribs oriented in different directions.

7. The element in accordance with the claim 1, wherein said ribs comprise a first group of ribs extending in a direction crossed with a second group of ribs extending in a different direction.

8. The element in accordance with the claim 1, wherein the element forms part of a bag for vacuum-packing products produced either alone or together with another flat sheet element, said ribs being diagonal or crossed and occupying an inner surface of at least one side of the bag.

9. A bag for vacuum-packing food products, the bag comprising:

a sheet element the sheet element comprising at least two layers or films made of different material that are joined together, one of said layers or films being an inner layer of film intended to form an inner surface of at least one side of each bag, said inner layer of film having elongate ribs comprising material disposed on said inner layer of film and projecting beyond an adjacent surface of said inner layer of film, said ribs having a length much greater than a width thereof and being oriented to be not in parallel to a longitudinal axis of the bag, each rib having a plurality of transverse cavities or notches, which are spaced along each respective rib proper, said ribs cooperating to delimit channels or spaces converging to a mouth of the bag at a non-90° angle, said transverse cavities or notches providing a passageway between adjacent channels on opposite sides of each rib.

10. The bag in accordance with claim 9, wherein said ribs are continuous or intermittent in length and rectilinear or curvilinear.

11. The bag in accordance with claim 9, wherein said ribs have at least one longitudinal groove intersecting said cavities or notches along the rib.

12. The bag in accordance with claim 10, wherein said ribs have at least one longitudinal groove intersecting said cavities or notches along the rib.

13. The bag in accordance with claim 9, wherein said ribs are oriented in the same direction.

14. The bag in accordance with the claim 9, wherein said ribs comprise at least two group of ribs with one group of ribs being oriented in one direction and another group of ribs being oriented in another direction.

15. The bag in accordance with the claim 9, wherein said ribs comprise a first group of ribs extending in a direction crossed with a group of ribs extending in a different direction.

16. A bag for vacuum-packing food products, the bag comprising:

a an outer film layer formed of a material;

an inner film layer formed of a different material, said outer film layer being joined to said inner film layer;

ribs disposed on said inner layer of film and projecting beyond an adjacent surface of said inner layer of film, said ribs being oriented to be not in parallel to a longitudinal axis of the bag, each rib having a length much longer than a width thereof and extending from the adjacent surface of said inner layer of film to the upper level of the rib except at a plurality of transverse passageways forming rib passages with said rib projecting from the adjacent surface of said inner layer of film to a passage level at a location between said upper level of the rib and the adjacent surface of said inner layer, said passageways being spaced along each respective rib proper, adjacent said ribs cooperating to delimit channels or spaces converging to a mouth of the bag at a non-90° angle, said passageways providing communication between adjacent channels on opposite sides of each rib.

17. The bag in accordance with claim 16, wherein said at least a plurality of said ribs have a longitudinal groove formed by the rib material and extending along the rib, each longitudinal groove intersecting at least one of the passageways.

* * * * *